No. 775,240. PATENTED NOV. 15, 1904.
E. CROWE.
CONTROLLING AND GOVERNING GEAR FOR PRESSURE ENGINES.
APPLICATION FILED JUNE 16, 1903.
NO MODEL. 2 SHEETS—SHEET 1.
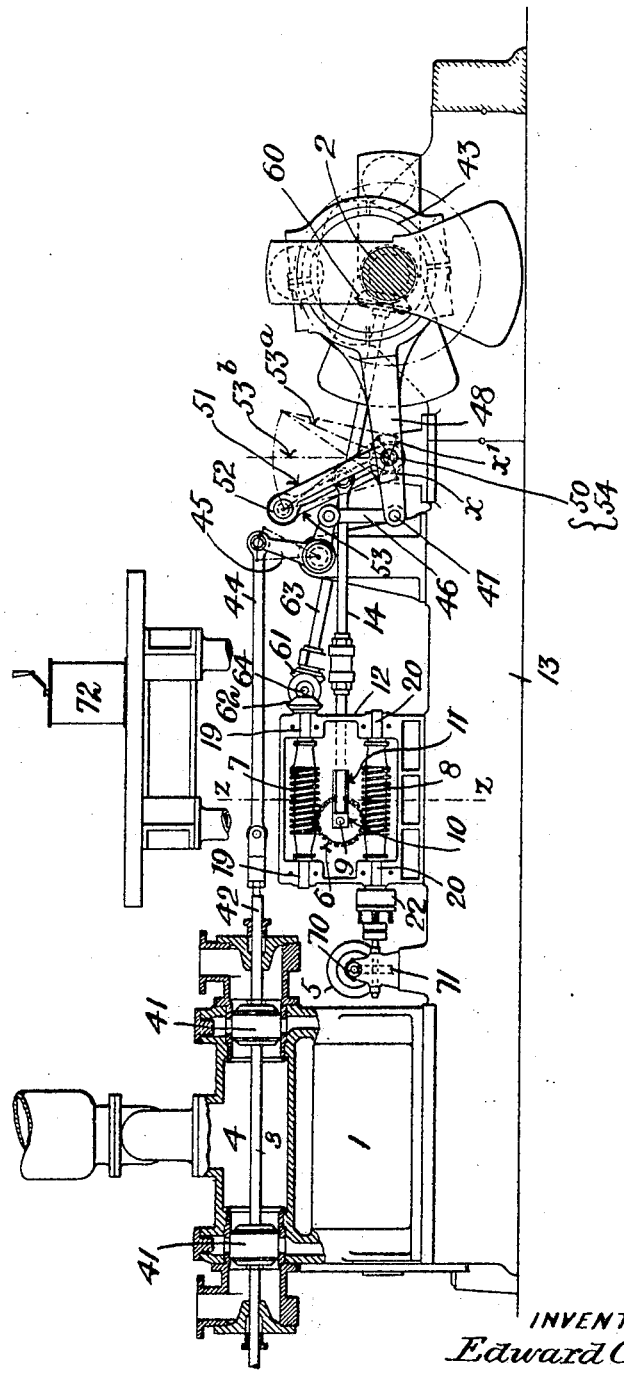
F I G. 1.
WITNESSES:
W. M. Avery
J. P. Davis
INVENTOR
Edward Crowe
BY
[signature]
ATTORNEYS No. 775,240. PATENTED NOV. 15, 1904.
E. CROWE.
CONTROLLING AND GOVERNING GEAR FOR PRESSURE ENGINES.
APPLICATION FILED JUNE 16, 1903.
NO MODEL. 2 SHEETS—SHEET 2.

FIG. 2.

WITNESSES:
W. M. Avery
J. P. Davis

INVENTOR
Edward Crowe
BY
ATTORNEYS

No. 775,240.  
Patented November 15, 1904.

UNITED STATES PATENT OFFICE.

EDWARD CROWE, OF SHEFFIELD, ENGLAND, ASSIGNOR OF ONE-HALF TO DAVY BROS., LIMITED, OF SHEFFIELD, ENGLAND, (INCORPORATED.)

CONTROLLING AND GOVERNING GEAR FOR PRESSURE-ENGINES.

SPECIFICATION forming part of Letters Patent No. 775,240, dated November 15, 1904.

Application filed June 16, 1903. Serial No. 161,714. (No model.)

*To all whom it may concern:*

Be it known that I, EDWARD CROWE, engineer and chief draftsman, a subject of the King of Great Britain, residing at Bircholm, Bushey Wood, Totley Rise, Sheffield, England, have invented certain new and useful Improvements in Controlling and Governing Gear for Pressure-Engines, of which the following is a specification.

This invention relates to the controlling (including the starting, stopping, and governing) of steam and other pressure engines, and has the twofold object of reducing to a minimum the manual labor required to adjust the controlling device and of automatically regulating during the running of the engine the supply of steam or other motive fluid according to the amount of load for the time being on the engine.

In carrying the invention into practice I employ the power, on the one hand, of an auxiliary motor and, on the other hand, of the engine which is itself to be controlled to actuate the expansion or reversing valve-gear, the auxiliary motor and the engine being applied to act on the said expansion or reversing valve-gear with contrary effects, so that each will counteract or neutralize completely or partially in any given ratio the effect produced by the other. The conjoint effect produced on said valve-gear by the mutually-neutralizing actions of the auxiliary motor and of the main engine is to establish equilibrium between these mutually-opposing actions when the main engine attains a speed which bears a certain ratio to the then speed of the auxiliary motor. If, therefore, the motor be adjusted to run at a given speed, the valve-gear of the main engine will be adjusted to cause the engine to work at a given grade of expansion for a given load, any variation of load having for effect to cause an inversely-corresponding variation of the grade of expansion. Furthermore, this effect will be produced for all grades of expansion and for both directions of running. Moreover, the direction of running of the main engine is dependent on the direction of running of the auxiliary motor, so that reversal of the main engine will be brought about by reversal of the auxiliary motor.

The invention consists in the particular construction and arrangement of parts, as hereinafter fully described, and pointed out in the claims.

Reference is to be had to the accompanying drawings, forming part of this specification, wherein—

Figure 1 is a side elevation, partly in section, showing the improvement applied; and Fig. 2 is a plan view of the same.

The same reference characters indicate corresponding parts in both figures.

In the drawings, $1^a 1^a$ are center lines of the working cylinders 1, and 2 the crank-shaft of a pair of reversing horizontal steam-engines, each engine being provided with its own slide-valve expansion or reversing gear, as usual. Since the application of the improvement to each reversing-gear is the same, it will be described with reference to one only.

3 is the piston slide-valve controlling the supply of steam to the valve-chest 4 of the engine, as usual, and of which the position is to be controlled, this control being exercised by the mutually-counteracting influences of the main engine itself and of an auxiliary motor 5. The gear through which this mutual counteraction is produced is in the nature of a differential or "hunting" gear, and preferably consists of a worm-wheel 6 in gear with two worms 7 and 8, having threads of the same pitch and the same direction of twist, the relative arrangement being such that when the worms revolve at equal speeds the worm-wheel will merely revolve about its axis without change of position; but when one only of the said worms is driven or when one worm is driven faster than the other the worm-wheel will be caused to roll and travel upon the other worm as upon a stationary rack. The worm-wheel is mounted to turn upon a cross-pin 9, carried in a pair of die-blocks 10, fitted to slide in guide-slots 11 in stationary frames 12, which may be mounted on the engine-bed 13, as indicated, and the worm-wheel axis is coupled by a forked connecting-rod 14 to the swinging arm 53, so that any movement of translation imparted as above mentioned to the worm-wheel will produce a corresponding change in position of said piston-valve, as hereinafter described.

The shafts of the worms 7 and 8 are mounted in bearings 19 20 in the frames 12, parallel to one another and tangential to the worm-wheel 6 at diametrically opposite points, and the shaft of the worm 8 is driven by the auxiliary motor 5 through the medium of a friction-clutch 22 of any suitable construction, while the shaft of the worm 7 is driven from the crank-shaft 2 of the main engine through any suitable intermediate gear—such, for example, as bevel-gearing 60, 61, 62 and the shafts 63 and 64.

The auxiliary motor may be actuated by electricity, hydraulic, steam, gas, or other power, and it may be controlled in such a manner that it can be instantly started or stopped or kept running at any speed in either direction, with the effect of imposing upon the engine a corresponding condition as to motion or speed of motion or direction of running.

The piston-valve comprises piston-heads 41, mounted on the spindle 42, and the said spindle 42 receives reciprocating motion from a single eccentric 43 through the medium of a connecting-rod 44, bell-crank lever 45, and link 46, pivoted to the tail end 47 of the eccentric-rod 48, which is pivoted at 50 to a swing-link 51, suspended on a pivot 52, carried by an arm 53, mounted on the weigh-shaft 54. The valve being at mid-stroke in Fig. 1, the centers 50 and 54 appear to coincide in said figure.

When the arm 53 is in the position shown, the pivot 50 is caused by the horizontal component of the motion produced by the rotation of the eccentric to move in an arc indicated by the dotted line $x$, while the vertical component of the motion causes the eccentric-rod to vibrate about that pivot 50 and so to operate the slide-valve for one direction of running, whereas when the arm 53 is in the position indicated by the dotted center line $53^a$ the pivot 50 will vibrate in the arc $x'$ and the valve will be operated for the other direction of running of the main engine. When the arm 53 is in the mid-position $53^b$, the steam admission is reduced to the minimum.

The position of arm 53 is determined by the position of the worm-wheel 6, whose cross-pin 9 is coupled to the arm 53 by a pair of connecting-rods 14, as hereinbefore described.

The operation of the worm-gear is such that any difference of speed between the two worms 7 and 8, having for effect (for the one direction of running) to cause a movement of translation of the worm-wheel axis 9 between the one limit of its travel and the median line $z\ z$, which correspond to the mid-position $53^b$ of the arm 53 and similarly for the other direction of running between the opposite limit of the travel of the axis 9 and the same median line $z\ z$.

In the drawings the auxiliary motor 5 is assumed to be electrically driven, and its armature-shaft 70 is geared with the shaft of the worm 8 through worm-gear 71. The speed of the motor and likewise its direction of running is regulated through the medium of a hand-operated controller-switch, such as indicated at 72 and which may be of any suitable construction, adapted to vary the speed and direction of running of the auxiliary motor 5.

It has been indicated how the speed of the main engine is governed by the speed of the auxiliary motor, and it only remains to explain how the direction of running of the main engine is determined by the direction of running of the auxiliary motor. Supposing the engine to be at rest and the valve-gear to be in the position corresponding to forward running at full speed or under the maximum load, then if it be desired to run the engine in the reverse direction the setting of the valve-gear is effected by so adjusting the controller 72 as to cause the auxiliary motor 5 to run in the backward direction—i. e., in the direction contrary to that in which it is assumed to have been running previously. The effect of this will be to rotate the worm 8 in such direction as to cause the worm-wheel 6 to travel along the worm 7 to the other side of the median line $z\ z$ and the arm 53 to be swung over to the opposite side of the median line $53^b$, whereupon if the steam stop-valve be open the main engine will start in the required direction and will run with a grade of expansion determined by the point in the travel of the worm-wheel 6 at which the rotative effects of the action of the worms 7 and 8 neutralize each other.

It will be obvious without further illustration that the differential or hunting gear may be applied to adjust the mutual relation of the link and die-block or other parts which determine the grade of expansion in any other kind of reversing valve-gear.

I claim—

1. In an engine, the combination with a valve for controlling the supply of motive agent to the engine, of a worm-wheel mounted in sliding bearings, two worms meshing with the worm-wheel, mechanism for operating one worm from the engine, an auxiliary motor, mechanism for operating the other worm-wheel from the motor, means for operating the valve from the engine, a swinging member connected with the valve-operating means, and a connection between the said swinging member and the sliding bearings of the worm-wheel.

2. In an engine, the combination with a valve for controlling the supply of motive agent to the engine, of a worm-wheel mounted in sliding bearings, two worms meshing with the worm-wheel, one of the worms being operated by the engine, an auxiliary motor for operating the other worm, an eccentric, a connection between the eccentric-rod and valve, a swinging arm pivotally connected with the eccentric-rod, and a connection between the said arm and the sliding bearings of the worm-wheel.

3. In an engine, the combination with a valve for controlling the supply of motive agent to the engine, of a worm-wheel mounted in sliding bearings, two worms meshing with the worm-wheel, means for operating one worm from the engine, an auxiliary motor, means for operating the other worm from the said motor, an eccentric on the engine-shaft, a connection between the eccentric-rod and valve, a pivoted arm, a link connection between one end of the said arm and the eccentric-rod, and a connection between the pivoted arm and the sliding bearings of the worm-wheel.

4. In an engine, the combination with a valve for controlling the supply of motive agent to the engine, of a worm-wheel mounted in sliding bearings, two worms meshing with the worm-wheel, means for operating one worm from the engine-shaft, an auxiliary motor, means for operating the other worm from the said motor, an eccentric on the engine-shaft, a connection between the eccentric-rod and valve, a swing-link pivoted to the eccentric-rod, an arm pivoted at its lower end and to the upper end of which the swing-link is pivoted, and rods connecting the sliding bearings of the worm-wheel with said arm, the said rods being pivoted to the arm at about the center of length thereof.

EDWARD CROWE.

Witnesses:
  BAIN L. CAMPBELL,
  W. H. SLATER.